United States Patent
Naden et al.

(10) Patent No.: US 7,561,526 B2
(45) Date of Patent: Jul. 14, 2009

(54) COMMUNICATION NETWORK ROUTE DETERMINATION

(75) Inventors: James M Naden, Hertford (GB); Christopher J Reed, Hitchin (GB); Steven Hall, Harlow (GB); Andrew P Winsor, Elsenham (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1172 days.

(21) Appl. No.: 10/321,766

(22) Filed: Dec. 17, 2002

(65) Prior Publication Data

US 2004/0114569 A1 Jun. 17, 2004

(51) Int. Cl.
*H04L 12/26* (2006.01)
(52) U.S. Cl. .................. 370/238; 713/157
(58) Field of Classification Search ........... 370/238, 370/256, 395.43, 400; 713/157
See application file for complete search history.

(56) References Cited

U.S. PATENT DOCUMENTS

| | | | | |
|---|---|---|---|---|
| 4,974,224 | A | | 11/1990 | Boone |
| 5,699,347 | A | * | 12/1997 | Callon ............... 370/238 |
| 5,822,301 | A | * | 10/1998 | Arnold et al. ........ 370/238 |
| 6,049,872 | A | * | 4/2000 | Reiter et al. ......... 713/157 |
| 6,256,309 | B1 | * | 7/2001 | Daley et al. ....... 370/395.43 |
| 6,483,808 | B1 | * | 11/2002 | Rochberger et al. ... 370/238 |
| 6,760,314 | B1 | * | 7/2004 | Iwata .................. 370/254 |
| 7,002,917 | B1 | * | 2/2006 | Saleh .................. 370/238 |

FOREIGN PATENT DOCUMENTS

| | | |
|---|---|---|
| DE | 19528563 A1 | 2/1997 |
| DE | 19923245 A1 | 11/2000 |

OTHER PUBLICATIONS

XP-000898314—Aboelela E et al: "Fuzzy Metric Approach for Routing in B-ISDN" IEEE International Conference on Communications, NY: IEEE, US vol. 1 Jun. 6, 1999—pp. 484-488.

* cited by examiner

*Primary Examiner*—William Trost, IV
*Assistant Examiner*—Toan D Nguyen
(74) *Attorney, Agent, or Firm*—Barnes & Thornburg LLP

(57) ABSTRACT

A communications network comprises a plurality of linked nodes between a source and a destination. At each node the state of the network and its links are measured and stored with advertisements from other links. The node also performs a routing algorithm to define the instantaneously best path to the destination for the current network state. The routing algorithm responds to a plurality of metrics, including costs of links, and may use fuzzy logic which derives a fuzzy cost for candidate paths to derive a least fuzzy cost path to be followed. Traffic is shared between a path which is determined to be the best, at the current point in time, and a path which has previously been determined as the best path. The network can be a network which carries mobile cellular traffic.

46 Claims, 10 Drawing Sheets

|   | Available bandwidth | Available delay |
|---|---|---|
| L | 1 | $\dfrac{\text{required delay}}{\text{maximum delay}}$ |
| C | $1 + \dfrac{\text{margin}}{\text{required bandwidth}}$ | 1 |
| R | $\dfrac{\text{maximum load} - \text{margin}}{\text{required bandwidth}}$ | $\dfrac{\text{required delay}}{\text{minimum delay}}$ |
| XR | 2000 | 100 |

Available cost: High

| Available bandwidth | Available delay | Fuzzy cost |
|---|---|---|
| Fit | Fit | Excellent |
| Low | any | Bad |
| any | Low | Bad |
| Fit | High | Very good |
| High | Fit | Very good |
| High | High | Good |

Figure 6 (d)

Available cost: Low

| Available bandwidth | Available delay | Fuzzy cost |
|---|---|---|
| Fit | Fit | Bad |
| Low | any | Bad |
| any | Low | Bad |
| Fit | High | Bad |
| High | Fit | Bad |
| High | High | Bad |

Figure 6(e)

COMMUNICATION NETWORK ROUTE DETERMINATION

FIELD OF THE INVENTION

This invention relates to a method for determining routes in the network of a communications system and allocating traffic thereto such that the capacity of the network is improved, as is the network's ability to support traffic having multiple Quality of Service requirements and/or precedence levels. The invention also relates to a communications system having such improved capacity and the ability to support such traffic having multiple Quality of Service requirements and/or precedence levels.

BACKGROUND OF THE INVENTION

Mobile cellular operators are placing increasing demands on capacity in order to support greater numbers of subscribers and higher bit-rate services. The combination of these factors is placing increasing pressure on the restricted amount of available radio spectrum. It is also proving difficult to meet the quality of service (QoS) requirements of the range of services to be supported and to achieve uniform availability of these services throughout the area of the network.

In attempts to provide more efficient use of the available spectrum, and more uniform coverage of the network area, for higher rate services in particular, workers in this field have considered the use of ad hoc networking between mobile terminals, such that a terminal with a poor quality link to a base station can pass its signal to another mobile terminal, to which it has a better quality link, for onward transmission to the base station, either directly or via one or more other mobile terminals. Similarly, a terminal with a poor quality link from a base station can receive its signal from another mobile terminal, from which it has a better quality link, this terminal having itself received the signal from the base station, either directly or via one or more other mobile terminals. Thus the overall path to or from the base station is improved by introducing additional hops via one or more intermediate mobile terminals. This arrangement is sometimes referred to as a "multi-hop" network or "multi-hop" architecture.

A routing protocol is then required to determine the path that a given signal should take: in the uplink direction, this may either be directly from the source mobile terminal to the base station or indirectly using one or more intermediate hops via other terminals; and in the downlink direction, this may either be directly from the base station to the destination mobile terminal or indirectly using one or more intermediate hops via other terminals.

These other terminals, via which better quality paths to and or from the base station exist, will often be nearer to the base station. Geometric considerations suggest that the proportion of such terminals in a given cell is likely to be low: the number of such terminals in a given cell is likely to be relatively small in relation to the total number of terminals in the cell.

Where multiple hops are involved, via intermediate terminals, some of these terminals, having particularly good links to the base station, may become overloaded, as they will be included in the paths from a large number of source terminals. Similarly, in the downlink direction, where multiple hops are involved, via intermediate terminals, some of these terminals, having particularly good links from the base station, may become overloaded, as they will be included in the paths to a large number of destination terminals. This increases the probability of congestion occurring in the cell.

Congestion is evidenced by a failure of traffic to meet its QoS requirements. The traffic load at which congestion occurs is dependent on the specific QoS requirements of the individual traffic type, its precedence level and the mix of traffic in the network. Different traffic types will experience congestion at different traffic loads. It preferentially affects low precedence and delay sensitive traffic. It is undesirable, for example, for delay sensitive traffic to be queued behind delay tolerant traffic, as the delay tolerant traffic could cause the delay sensitive traffic to exceed its delay limit and hence fail to meet its QoS requirements.

The routing protocol therefore needs to be sensitive to traffic load in the network and to the Quality of Service requirements and precedence level of each traffic type, in addition to the network topology. Furthermore, because of the dynamic nature of the network, due to terminal mobility, the vagaries of the channel, and fluctuations in traffic load, the routing protocol must be capable of dynamically adapting with the network topology and the network state.

Several routing protocols have been proposed which attempt to balance the variables found in a typical network where between nodes representing a source and a destination of a path for communication traffic there are intermediate nodes which define links so that the path is defined by a concatenation of the links, such protocols employing algorithms that address the choosing of appropriate links through the network.

E. W. Djikstra, in a paper entitled "A note on two problems in connexion with graphs", Numerische Methematiik, 1 269, 1959, and incorporated here by reference, proposed an algorithm (hereinafter referred to as Dijkstra's algorithm) which seeks to find a path following the shortest route through a network from the source to the destination node. The length of an individual link in the path is described by a "cost", which is assigned by the network manager. The length of the path is then defined as the sum of this "cost" over all of the links that make up the path. Advantageously, such a least-cost-path algorithm is stable but, disadvantageously, all of the traffic from a given source to a given destination uses the same path, resulting in congestion at relatively low traffic loads, and there is no provision for discriminating between traffic of different types, having different QoS requirements and/or precedence levels. This can result in, for example, delay sensitive traffic being queued behind delay tolerant traffic, whereby the delay sensitive traffic fails to meet its QoS requirements.

Z. Wang and J. Crowcroft, in a paper entitled "Quality of service routing for supporting multimedia applications", IEEE Journal on Selected Areas in Communications, 14 (7) 1228, September 1996, proposed routing algorithms based on Dijkstra's algorithm but making use of additional information regarding the current network state, rather than just a single link cost, pre-processed to form a subset to which a form of Dijkstra's algorithm can then be applied. The links through the network are classified according to bandwidth, and then, for each class, the least delay path is found by using delay, rather than cost, as the variable. Although this provides limited separation of the traffic classes, there is a tendency for paths following the least delay routes to become congested.

E. Aboelela and C. Douligeris, in a paper entitled "Fuzzy metric approach for routing in B-ISDN", IEEE Int. Conf. on Comms. 1999 (ICC 99), 1 484, June 1999, proposed a routing algorithm which defines a fuzzy logic system to combine the available bandwidth and delay of each link in the path to form a "fuzzy cost" for the path, and to use this in Dijkstra's algorithm instead of the simple link costs. This approach has the merits of finding distinct routes for each traffic class, so that more of the network resources are brought into use. However, this modified definition of cost means that widely divergent routes can be found that use excessive amounts of network resources and this algorithm can therefore be inefficient.

Such routing protocols that adapt to the network state by use of measured network metrics to meet QoS and/or precedence requirements may for convenience be referred to as "QoS routing protocols" and effect "QoS routing"

It is well known that QoS routing protocols that are sensitive to, and adapt to, the network state can produce unstable solutions, such that the calculated route varies each time that the calculation is performed, often oscillating between two solutions in a process known as "route flap". To briefly summarise the effect, when a measurement is made of the prevailing network conditions, a route is calculated accordingly, which may be called route "A". Traffic is then directed along route A. The additional traffic load on route A changes the network state such that, when a new measurement is made and the routing calculation repeated, a different route is found, which may be called route "B". Redirecting the traffic to route B restores the original network state such that the next measurement and subsequent calculation result in route A being found again. Thus the routing algorithm oscillates between paths following route A and route B as traffic is alternated between these routes in response to routing calculations. It will be appreciated that the same phenomenon may be experienced with more than two routes and although appearing less dramatic than a simple oscillation, is nevertheless wasteful of network resources as rapid and frequent changes in distribution of traffic in the network result in increased link state advertisements throughout the network that use up resources.

The basic Dijkstra's algorithm is not susceptible to route flap because it relies only on a fixed link cost as input. However, QoS sensitive routing algorithms, such as those proposed by Wang and Crowcroft and by Aboelela and Douligeris are susceptible.

From the above, it will be seen that there exists a requirement for a routing protocol that is capable of practical implementation not only to define paths that follow stable routes within a dynamically varying network for traffic of different types, having different QoS requirements and or precedence levels, but also capable of allocating such traffic to these routes in an efficient manner.

This invention relates to determination of routes in a network, such as a dynamic wireless network, a multi-hop cellular wireless network or an ad hoc wireless network, in which traffic of multiple types is present, each traffic type having different QoS requirements and or precedence level. It is assumed that the network topology is known, having been determined by a separate protocol, although it may be time varying. It is further assumed that the network state is varying, such that the available bandwidth and delay on each link are changing with time, for example, due to varying traffic load and/or to changes in the propagation conditions in the various radio channels.

One particular application envisaged is that of a mobile cellular network in which the mobile terminals in a given cell may communicate with one another in an ad hoc manner, possibly under the control of the base station in that cell, as in a "multi-hop" network, such that the path taken by signals between any given source mobile terminal and destination base station, or between source base station and any given destination mobile terminal, may involve one or more intermediate hops via other mobile terminals.

Although the background to the invention has been presented in the context of a mobile cellular network, it will be apparent to those skilled in the art that the invention is equally applicable to other networks exhibiting similar dynamic properties. One such additional example is where the nodes are connected by point-to-point radio links.

It is particularly suited to networks with high connectivity, where the number of possible links between nodes, for example, mobile terminals, is relatively high in comparison to the number of nodes, such that there are multiple possible paths between most source and destination pairs. This does not imply that every mobile terminal is connected to every other mobile terminal in multiple ways; rather, that more than one path, possibly involving intermediate mobile terminals, exists between any one mobile terminal and the base station.

However, it is applicable in general to a network including a source and a destination node and between them a plurality of intermediate nodes and possible paths via at least one of said intermediate nodes.

OBJECT OF THE INVENTION

The invention seeks to provide a communication network including a routing protocol and scheme of routing that mitigates at least one of the problems of known methods.

SUMMARY OF THE INVENTION

In accordance with a first aspect of the invention there is provided a communication network comprising a plurality of nodes, including source and destination nodes and intermediate nodes, and at each node a router for effecting transfer of traffic along links between nodes, the router of at least one node, for each said class of traffic and destination, being operable to undertake a route determining step based upon stored values of information set by network manager and metrics of the network to determine for the current network state an instantaneously best path to be followed from that node towards the destination, and operable, in response to determination of a new instantaneously best path resulting from changed network metrics, and a difference between the newly determined instantaneously best path and a previously instantaneously best path, to effect allocation of traffic to one of said best paths in a shared manner.

The network may be dynamic, such that the topological relationship between nodes may vary, for example as nodes move geographically or links are added, removed or change their respective characteristics. The characteristics of the links may also vary with time, for example due to varying propagation conditions in the case of wireless links, or due to changing traffic load, thus causing their capacity to vary.

The traffic will typically be classified into various categories, classes or types, each characterised by a specific set of QoS requirements and a precedence level.

The route or path between the source node and the destination node in the network is determined according to a first processing step by means of a routing algorithm. In a preferred arrangement, the routing algorithm is stored in machine-readable form within each node.

At any one moment in time, the routing algorithm will usually provide a single path between each source and destination pair for each class of traffic. These paths are stored as a table referred to as a routing table in a store. As the network state evolves through time, due to changes in link characteristics, for example, the path calculated for a given traffic type between a given source and destination pair, varies. Conventionally, only one path, the most recently calculated, instantaneously best path, is stored in the routing table for each traffic type between each source and destination pair, and all of the traffic of this type between this source and destination pair is loaded onto this path. However, in accordance with the present invention instead of traffic automatically being allocated to the newly calculated, instantaneously best path, the router of said at least one node is operable to store each newly determined instantaneously best path along with at least one path to said destination previously best and provide at least some of said stored paths as candidate stored paths, determine from current network metric values associated with each said candidate stored path the suitability of each said candidate stored path to accept the traffic, and allocating traffic to one at a time of said candidate stored paths in accordance with its determined suitability.

Notwithstanding that the frequency at which the instantaneously best path is calculated is indeterminate the traffic is allocated to different paths preferably at what is assured to be a greater frequency, with discrete packets of traffic being shared amongst the paths with traffic being allocated for a greater percentage of time to paths that have greater suitability in comparison with those which have less, where such a difference exists.

Each stored candidate path, is preferably assessed for suitability based on the current network state and the traffic allocated accordingly. Notwithstanding the determination of suitability for each of the candidate paths, the allocation may furthermore be made according to a predefined relationship or, preferably, an effectively random element of selection, on a basis which evens out the unconditional use of the newly instantaneously best path that results in route flap.

In a preferred implementation of allocation to mitigate route flap, suitability of a candidate path is derived from path costs of the candidate paths for the current state of the network. Preferably, fuzzy logic is used to determine for each of said candidate stored paths a fuzzy cost estimate of the path derived from at least one of the measured metrics thereof as said path cost.

The fuzzy logic system may include input functions operable to receive, for each candidate stored path, a set of values of at least one of the path link metrics, a rule base relating said metric values, and an output function providing from the rule base as excited by each set of input metric values a fuzzy value estimate of the cost of said candidate stored path as a basis for suitability. In particular, the fuzzy logic may be used to combine network metrics such a cost, bandwidth and delay metrics with QoS requirements and precedence level of a traffic session having negligible bandwidth requirements, referred to as a "probe", to arrive at a "fuzzy cost" for each path in the store with its existing level of traffic.

The fuzzy logic may follow the general method proposed by Aboelela and Douligeris as outlined above with cost added as an additional metric, although other interpretations of the fuzzy logic process may readily be used by those skilled in the art without deviating substantially from the principle of the invention. Although bandwidth and delay may be used as the principal QoS metrics, it will be apparent to those skilled in the art that additional metrics, for example jitter, being the variation in delay, may be incorporated without substantially altering the principle of the method, or different or fewer metrics.

However, suitability is preferably not determined by least fuzzy cost alone, but by determining the suitability of any said candidate path to pass traffic in accordance with the fuzzy cost thereof being minimised by applied traffic and implemented by giving a weighting function value that has this effect. A sequence of effectively random numbers, truly-random or pseudo-random, may be provided within a range of values, corresponding to the sum of the weighting function values for the candidate stored paths, the range being divided into sections each corresponding in size to a respective weighting function value of the candidate stored paths, and the traffic allocated to the candidate stored path whose weighting function value corresponds to the section containing the current random number.

As discussed above, several routing algorithms have been described in the literature and are well known, although they suffer from various limitations. In a preferred arrangement, the routing algorithm is sensitive to the network state, specifically the network topology, the cost associated with each link, the bandwidth available on each link and the delay on each link, as currently available at the node in which the calculation is to be performed. The routing algorithm is also sensitive to the type of traffic, specifically to at least one of its QoS requirements and a precedence level, in so far as these relate to the bandwidth required and the delay tolerance of the traffic.

In a preferred form of the network, the node router is operated to provide a fuzzy logic system to combine the cost, bandwidth and delay metrics from the network with the QoS requirements and precedence level of the traffic to arrive at a "fuzzy cost" for a given path in the presence of the additional traffic and the routing algorithm is responsive to the fuzzy cost for each said path to derive an instantaneously best path dependant upon the fuzzy cost. The general method proposed by Aboelela and Douligeris is followed, with cost added as an additional metric, although other interpretations of the fuzzy logic process may readily be used by those skilled in the art, without deviating substantially from the principle of the invention.

Preferably the routing algorithm is of a least cost form, such as the above-mentioned Dijkstra's algorithm to which the "fuzzy cost" is input to efficiently determine the "least fuzzy cost" path between the source node and the destination node. The inclusion of cost in the fuzzy logic calculation has the effect of limiting the length of path, thus conserving network resources.

As with the use of fuzzy logic in allocating traffic amongst determined routes, in determining the instantaneous best route bandwidth and delay are suitably used as the principal QoS metrics with link cost. However, it will be apparent to those skilled in the art that additional metrics, for example jitter, being the variation in delay, may be incorporated without substantially altering the principle of the method.

In accordance with a second aspect of the invention there is provided a method of path determination in a communications network for communicating traffic from a source node to a destination node via at least one of a plurality of intermediate nodes, comprising the steps of: determining an instantaneously best path between said source node and said destination node based on measured network metrics, said path comprising a concatenation of communication links between said source node, said at least one of a plurality of intermediate nodes and said destination node; allocating traffic to said path; subsequently determining a new instantaneously best path between said source node and said destination node based on more recently measured network metrics and, where there is a difference between the newly determined instantaneously best path and a previously instantaneously best path, allocating traffic to one of said best paths in a shared manner.

BRIEF DESCRIPTION OF THE DRAWINGS

FIG. 6(d) shows the rule base for the combinations of delay, bandwidth and cost where the available cost is high in the fuzzy logic system;

FIG. 6(e) shows the rule base for the combinations of delay, bandwidth and cost where the available cost is low in the fuzzy logic system;

DETAILED DESCRIPTION OF THE INVENTION

Figure 1:
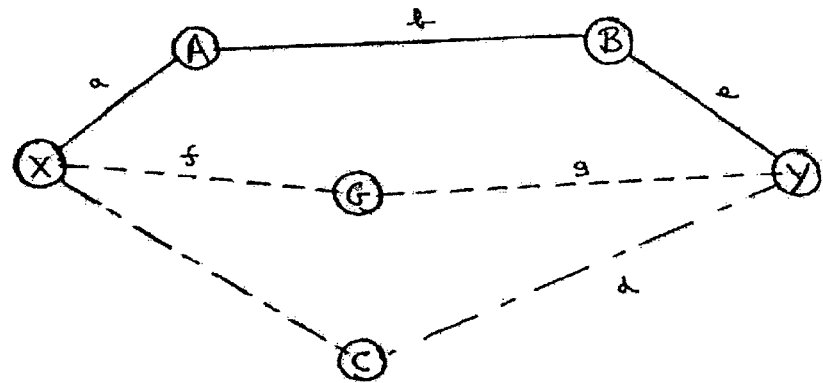
FIG. 1 is a simple network suitable for explaining the invention.

Referring to FIG. 1, this shows the topology of a simple packet communications network suitable for explaining the invention, and comprises start and destination nodes X and Y and intermediate nodes A, B, C and G, which define competing routes for traffic paths XABY, XCY and XGY between the start and destination nodes, whereby each path comprises a concatenation of communication links between the source node, at least one of the plurality of intermediate nodes and the destination node. It will be apparent that the network shown may be only a small part of a larger network and the node A is a source for this part only and may itself be a destination of an earlier part. It will also be understood that these may not be the only competing routes between the source node and destination node, but are identified by way of illustration only. Each of the nodes in a network will have at least one connection to another node in the network through that node's interfaces. These interfaces will connect to interfaces on other nodes through communications links, denoted by "a" to "g" in FIG. 1; these links could be wireless (e.g. line of sight microwave) or wireline (e.g. coaxial cable, optical fibre) in nature.

Figure 2:
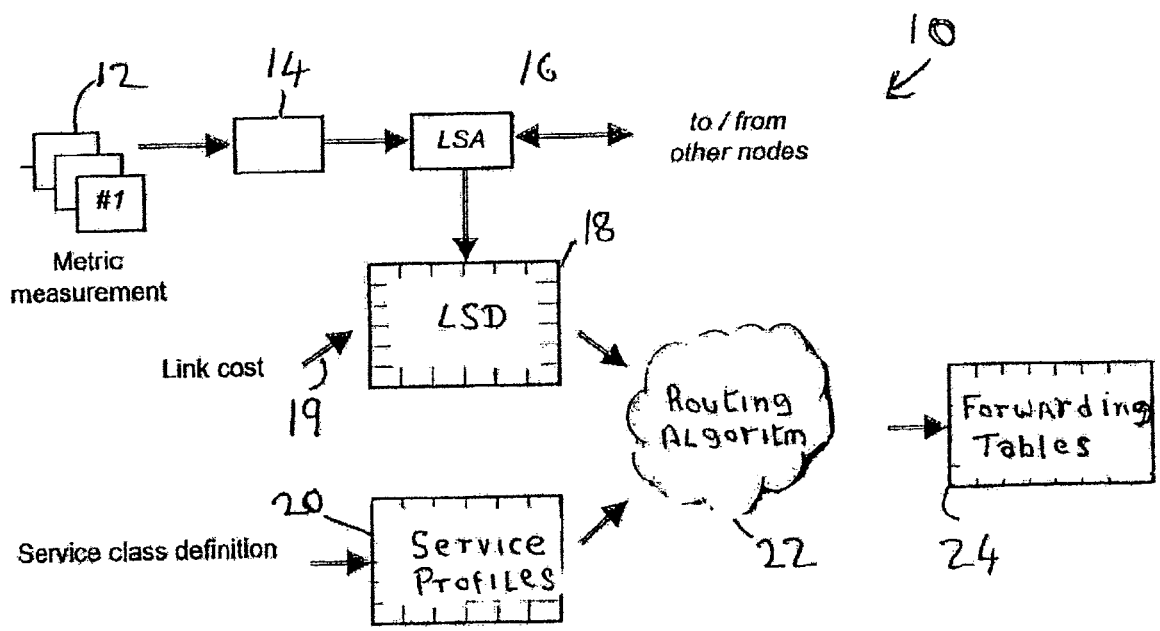
FIG. 2 is a schematic representation of a generalised routing protocol architecture.

At each node of the network, a routing protocol programme runs a routing algorithm to determine as a first processing step the direction in which data packets should be passed to reach the other nodes in the network, the nodes of a communications network being referred to interchangeably as routers for this function. The routing protocol has a structure, which is schematically shown at 10 in FIG. 2. This routing protocol architecture is for a general class of protocols known as link state routing protocols, which use measurements of the network state to determine the routes to be used. The elements of the protocol structure are as follows: firstly, at 12, measurement of the parameters associated with each link from the current node. In the preferred implementation, these should be the available bandwidth on the link and the delay experienced by packets traversing the link, but other metrics such as the jitter experienced by packets, are also viable. These measurements are then processed at 14 to determine whether they are significantly different from the previous values of the link metrics used in deciding that a routing calculation was made, that is, that the metric values have changed sufficiently to change the network state and warrant being distributed to other nodes. This distribution is accomplished through Link State Advertisements (LSAs) 16, and the locally generated LSAs and those received from other routers in the network are stored within the router as the Link State Database (LSD) 18. In addition to the measured parameters 19, other locally set parameters, such as the cost assigned to each link, which would be set by the network manager and not be expected to change frequently, will be inserted into the LSD and the LSAs generated by the router. Thus, the LSD contains a complete picture of the current network state and thus can be used as the basis for determining routes.

In addition, there are service profiles 20, which define for different classes of traffic that may flow in the communications network, the requirements that are required by those traffic classes. These will relate to the link metrics that are measured in the router. In the preferred implementation, these are the overall delay, the minimum bandwidth and the maximum path cost.

Figure 3:
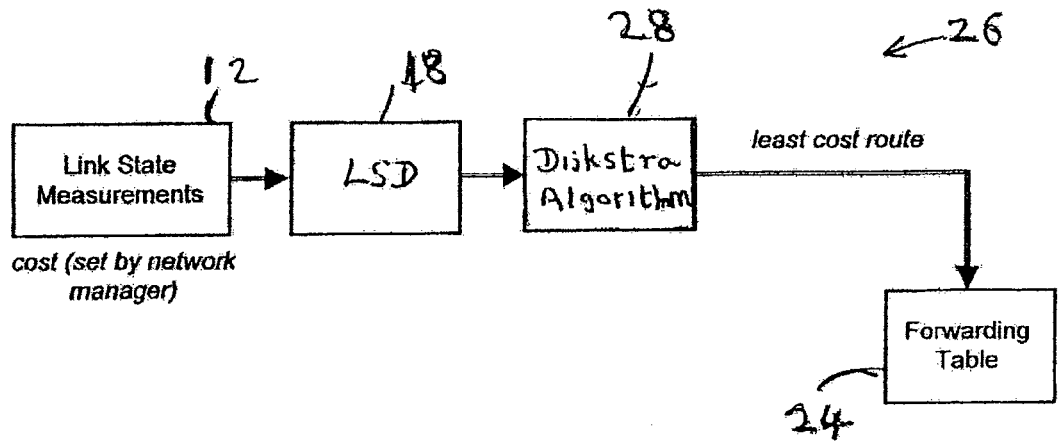
FIG. 3 is a schematic representation of the architecture of a routing protocol using the Dijkstra least cost algorithm as its routing algorithm, where link cost is the input variable in building routes.

The routing algorithm 22 that finds the routes runs a calculation that utilises some or all of the information in the LSD. Having determined a route for each traffic class to each destination, the route, or at least the first link thereof, is stored in a forwarding table 24. One of the simplest algorithms that can be used is the above referenced Dijkstra algorithm, sometimes known as the least cost algorithm, and a routing protocol architecture using it is shown schematically at 26 in FIG. 3. The Dijkstra algorithm 28 takes only the link cost in deciding the route to be followed. The routes found to each destination node are determined by having the lowest total cost, that is, the lowest total sum of link costs for the links that constitute the path.

Figure 4:
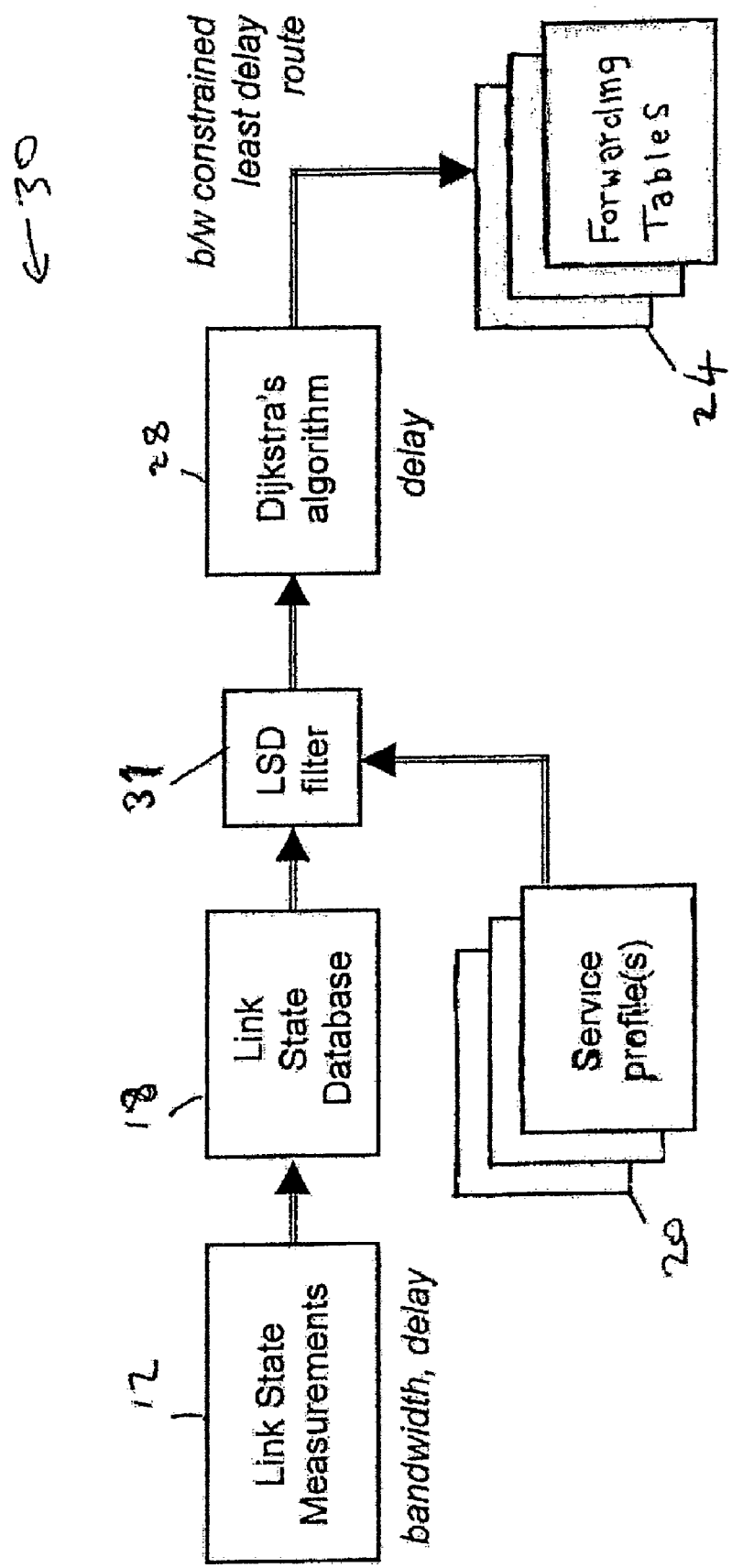
FIG. 4 is a schematic representation of the above referenced Wang and Crowcroft QoS routing algorithm which uses available bandwidth and delay measurements to find a bandwidth constrained least cost route.

As seen from the Figure, this algorithm does not make use of all of the possible LSD information. To determine routes which allow the traffic packet flow traversing them to meet certain Quality of Service (QoS) requirements, a QoS sensitive routing algorithm, conveniently referred to simply as a QoS routing algorithm, can be used. An example of such a routing algorithm is shown at 30 in FIG. 4, which shows schematically the algorithm reported by Wang and Crowcroft as discussed above. Those parts corresponding to the arrangement of FIG. 2 have like references but are not described again. In addition to the previously described integers of FIG. 2 there is a link state database (LSD) filter 31 which removes from consideration links with a bandwidth less than required; that is, it finds routes which meet a certain constraint on minimum available bandwidth, and which are of least delay. While this routing algorithm, which is a simple extension of the Dijkstra algorithm, offers the possibility of finding a QoS compliant route, it pays no attention to the cost of a route, that is, the sum of the link costs for the links in a given route. The cost of the route is important because the greater the cost of a path, the more of the network's resources have been consumed by traffic flowing along this path, and the less is available for other traffic in the network.

Consequently, a better routing algorithm for finding QoS compliant routes, is one satisfying the following requirements:

Firstly, it should seek to build paths where all the links used meet the bandwidth requirement.

Secondly, it should seek to build paths in which the sum of the delays over the used links should meet the delay requirement of the QoS class.

Thirdly, it should find a route, meeting these two requirements, which has the least cost in a hop-count sense, and hence minimises the network resources used by the session.

A method for doing this is illustrated schematically at 40 in FIG. 5, and again previously described integers are given the same references without description. Insofar as the routing algorithm departs from the simple cost input described by Dijkstra it is shown as modified Dijkstra algorithm 28'. This shows the use of a fuzzy logic system (FLS) 32 as a way of processing the LSD information in determining the routes. The techniques of fuzzy logic are well known and in the preferred implementation the system outlined by Aboelela and Douligeris is extended to use not only the bandwidth and delay of candidate routes but also the cost of those routes. Such a fuzzy logic system can be extended to include other link metrics, such as the jitter experienced by data packets. The fuzzy logic system is a process involving non-linear algorithms to turn the set of bandwidth, delay and cost metric values for the links in a path into a single "fuzzy cost": the lower the fuzzy cost, the better is the path from the perspective of a particular traffic type, defined by the service profiles. The calculated fuzzy cost can be used within the Dijkstra or other least cost path algorithm to find the path with the least fuzzy cost between a source and destination node pair. This involves the retention and use of the individual link information from the LSD at each stage in the calculation, rather than just the metrics for the next link in a path.

Figure 6A:
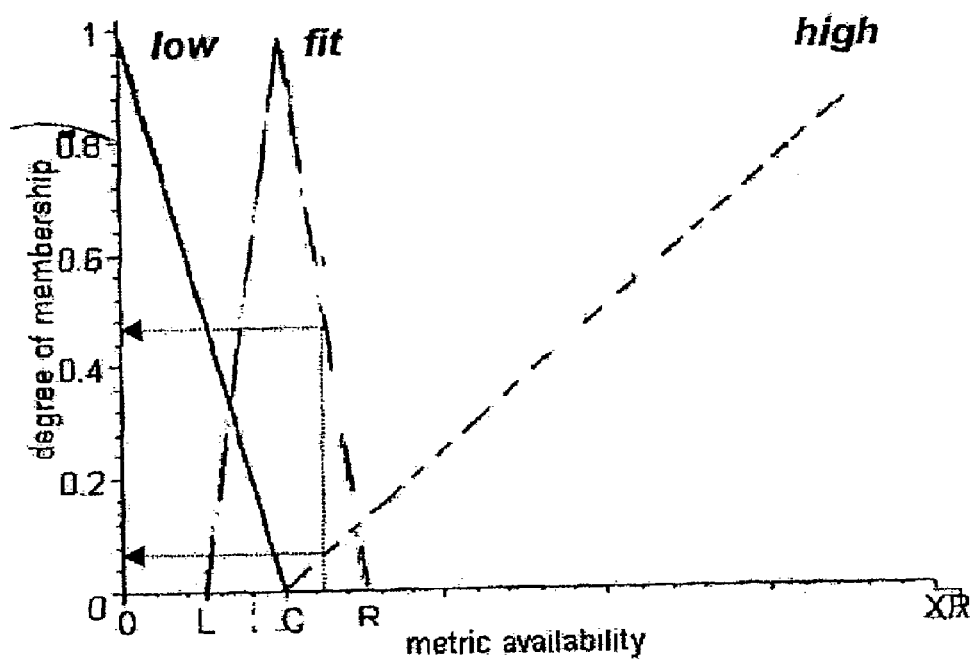
FIG. 6(a) shows the input membership functions for the variables of delay and bandwidth in the fuzzy logic system.
Figure 6B:
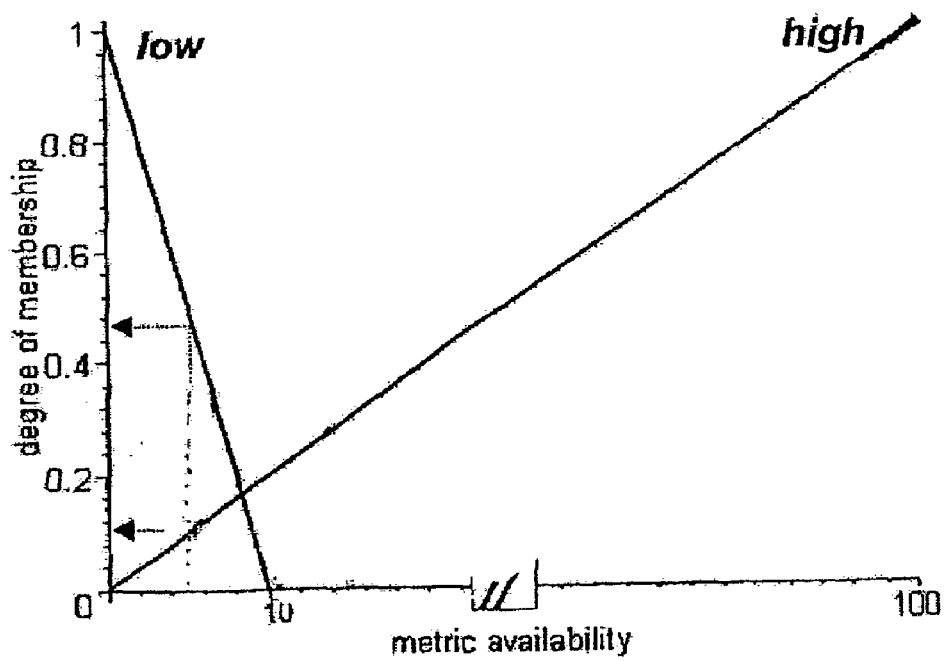
FIG. 6(b) shows in table form the set points of the membership curves for delay and bandwidth in terms of the values defined within the service profiles.
Figures 6C, 6F:
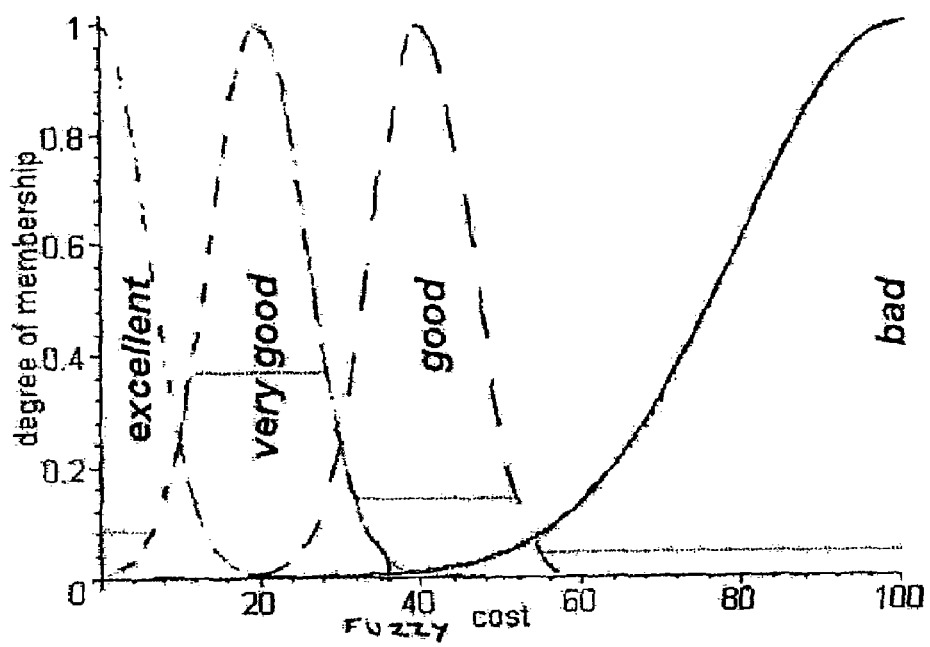
FIG. 6(c) shows the input membership functions for path cost in the fuzzy logic system.
FIG. 6(f) shows the output membership functions for the fuzzy logic system.

The calculation of the fuzzy cost is illustrated in FIGS. 6(*a*) to 6(*f*). Based on the structure outlined by Aboelela and Douligeris, the process for calculating a fuzzy cost can be outlined as follows.

At each stage in the calculation of routes, the composite bottleneck bandwidth, composite end-to-end delay and composite cost are used as input to a set of metric membership functions with the aim of finding a route which fits the bandwidth and delay constraints as closely as possible as well as being of minimum cost.

For the bandwidth and delay, these membership functions take the form shown in FIG. 6(*a*). It should be noted that this considers the metric availability, thus a low availability means there is not sufficient of the variable concerned. Thus, a low available bandwidth implies that there is insufficient bandwidth for a given session; a low available delay implies that the delay is too large for the traffic session. The key points of the Low, Fit and High curves are indicated in the table in FIG. 6(*b*). These relate the available bandwidth and available delay to the values defined within the service profile.

In terms of cost, an alternative metric availability function is used in which there are only two characteristics, Low and High available cost, as shown in FIG. 6(*c*). The low characteristic is excited when the cost of the path under test is much larger than desired; similarly, the high characteristic is excited when the overall cost of the route is low.

Based on the characteristics that are excited for the bandwidth, delay and cost metric membership functions, an appropriate fuzzy rule from a fuzzy rule base is selected; the fuzzy rule base is shown in FIG. 6(*d*) and FIG. 6(*e*) for the case of the available cost being high and low respectively. The fuzzy rule produces a value which is the minimum of the input membership function values input to that rule. Formally this is expressed as "Premises connected by AND result in a degree of membership mk of the output fuzzy set k given by min(mi,mj), where mi, mj are the degrees of membership of the corresponding fuzzy input sets". This is repeated for each combination of the excited fuzzy rules.

It can be seen from these tables that the best option (Excellent) occurs when the bandwidth and delay both fit the required profile and the available cost is high (that is, the cost of the route is low). The excited portion of the rule base, being the maximum of the values realised for each individual rule, is used with the cost membership functions shown in FIG. 6(*f*). Formally this is expressed as "Rules are combined by OR such that the degree of membership of the combination is given by max(mi,mj . . . ), where i,j . . . represent the output fuzzy sets".

These cost functions are based on Gaussian distributions. For the excited function (excellent, very good, good or bad) the respective curve is truncated at the level given by the minimum of the values from the membership functions. For example, if the fit bandwidth curve has a value of 0.8, the high delay curve has a value of 0.6 and the high cost curve has a value of 0.9, then the very good cost function will be truncated at a horizontal level of 0.6. The resulting curve can be integrated numerically to find the centre of area and hence the "crisp" value of the fuzzy cost for the set of values in question. For a set of metrics which fit the values of available bandwidth and available delay and have high available cost with high degree of membership, the result of truncating the excellent cost function and finding the centre of area will be a low value. In other words, the ideal combination of metrics is identified by the least cost.

In implementing this routing algorithm with the Dijkstra algorithm 28' to find the least fuzzy cost path route between a source and destination pair, the complete set of link information is used in evaluating the fuzzy cost of the route. The variety of different ways in which a "bad" result can be obtained ensures that a poor route can easily be discarded, as the value of the crisp cost becomes shifted to a very large number.

Figure 5:
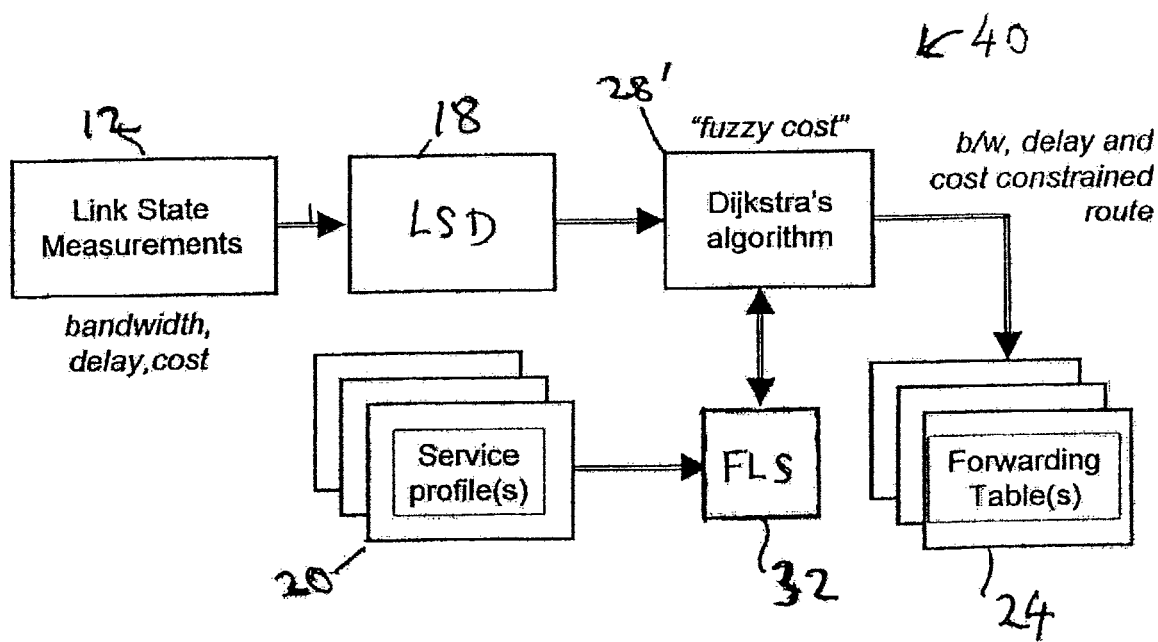
FIG. 5 is a schematic representation of the architecture of a routing protocol in accordance with the invention using a fuzzy logic system to determine an instantaneously best path.

Thus, in the form illustrated in FIG. 5, having determined by a first processing step the preferred or instantaneously best path for each traffic class and destination, traffic is simply allocated to it. However, as discussed above, there is a difficulty in using QoS routing algorithms, which are sensitive to changes in network state, in that route flap can occur. The algorithm reported by Wang and Crowcroft, and the fuzzy logic based least fuzzy cost algorithm are both subject to route flap.

Figure 7:
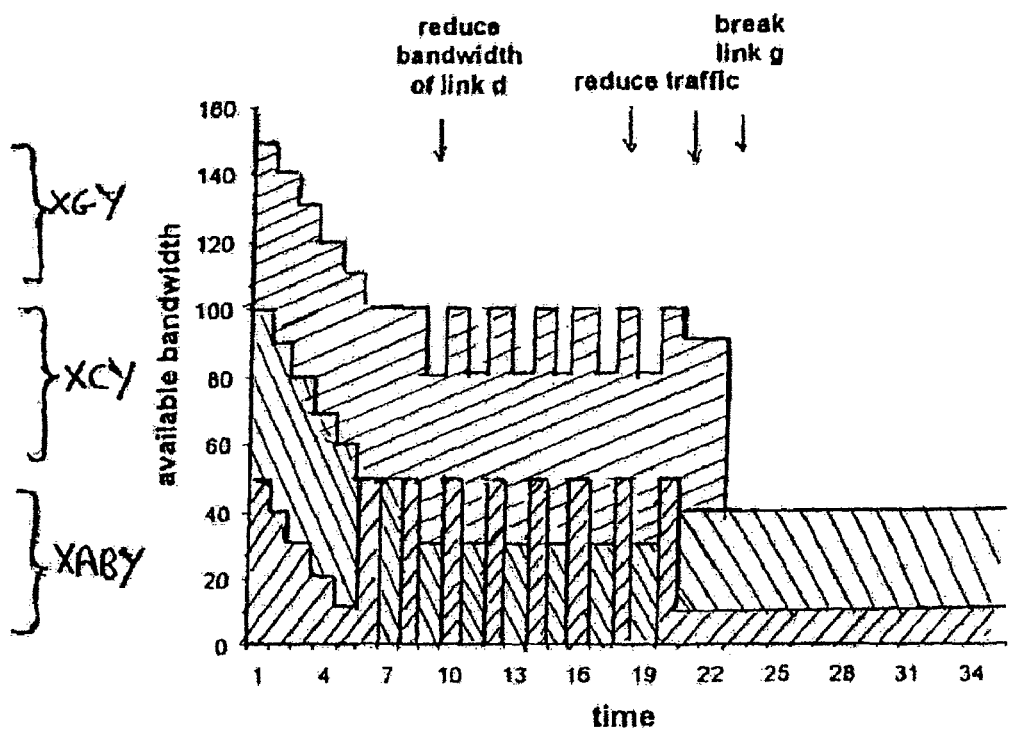
FIG. 7(a) shows an example of how the available bandwidth varies as traffic is ramped in the network of FIG. 1, with certain link and traffic volume changes with time, when the network is running the routing protocol based on the fuzzy logic system and illustrating the potential for route flap.
FIG. 7(b) shows the volume of traffic on each route for the network running the routing protocol based on the fuzzy logic system and the same conditions as FIG. 7(a)
Figure 7:
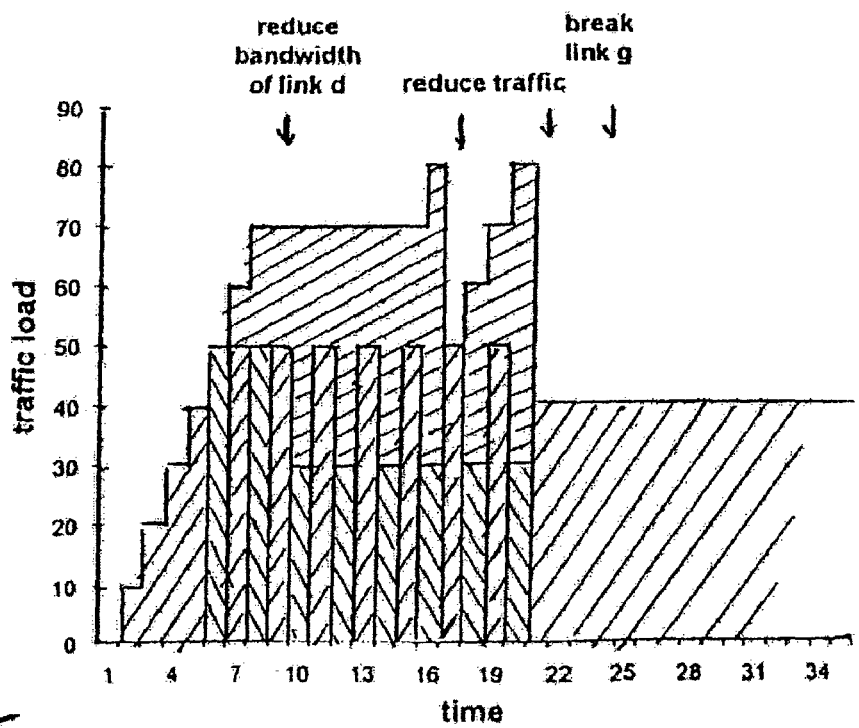

An example of the effect of route flap, even with the least fuzzy cost routing algorithm, is illustrated in the FIGS. 7(*a*) and 7(*b*), in which traffic is to be routed from node X to node Y of the network in FIG. 1. The traffic level is ramped up, and the costs of the competing paths XABY, XCY and XGY change as traffic flows. The available bandwidth on each link is shown in FIG. 7(*a*), and the traffic flow on the paths is shown in FIG. 7(*b*). For convenience the bandwidth and traffic loads of the various paths are shown stacked. Once traffic is close to the limit of any one link, the route chosen by the routing algorithm swaps frequently, and there is a portion of traffic which will be lost despite the total capacity of the three paths being much more than this value.

Figure 8:
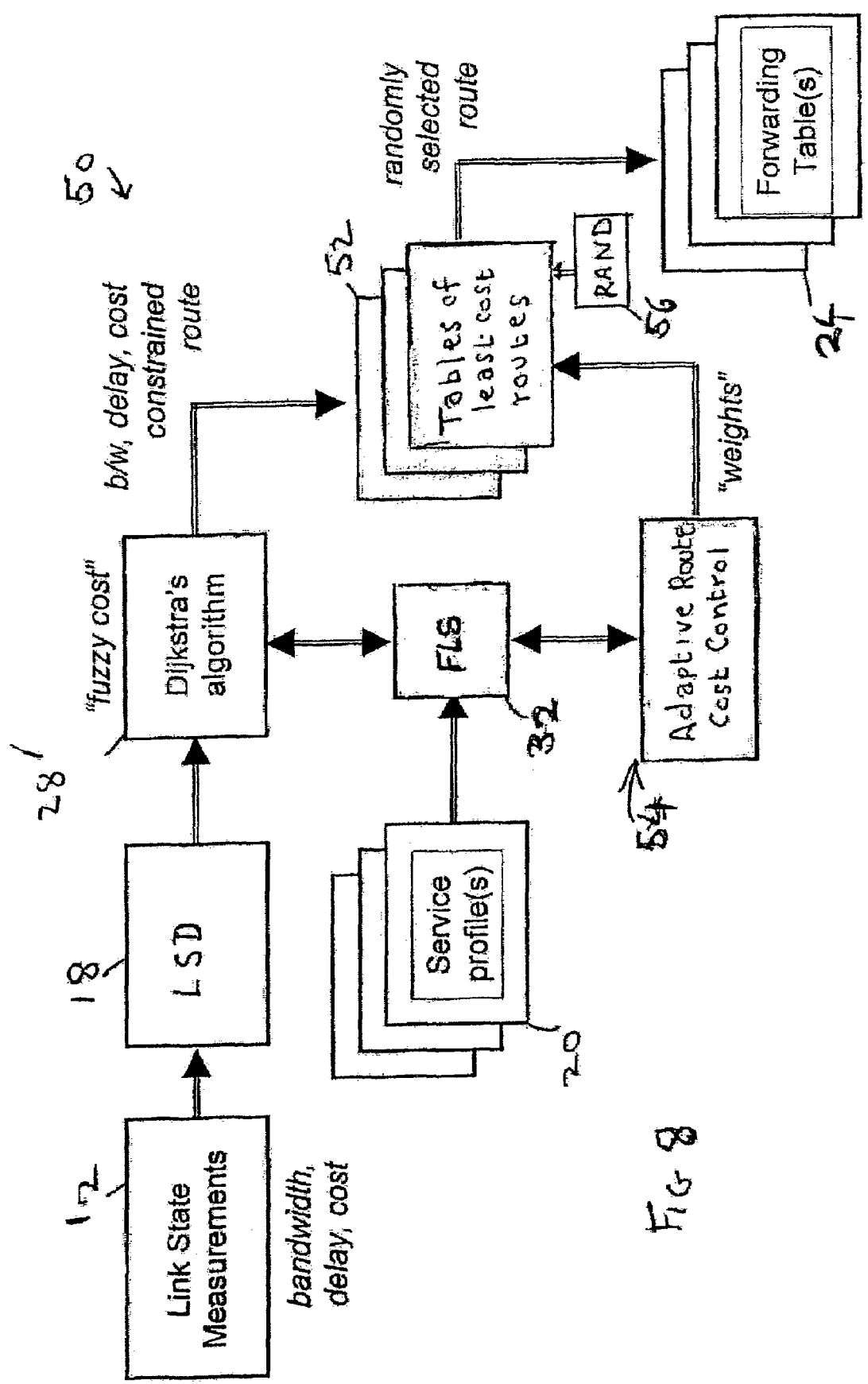
FIG. 8 is a schematic architecture of the routing protocol using the fuzzy logic system of the least fuzzy cost route determining algorithm with an allocation control system for controlling route flap, which itself utilises the fuzzy logic system.

To address and mitigate such route flap, the network at each node is arranged to control and effect allocation of traffic in a more complex manner than simply assigning it all to the instantaneously best path to a destination, and an architecture for implementing such allocation is shown in FIG. 8 at 50. The architecture of FIG. 8 is employed where the fuzzy logic based routing algorithm (comprising FLS 32 and the Dijkstra algorithm 28') is being used to find paths to the destination.

When the routing protocol starts running, it initially calculates instantaneously best routes to the reachable destinations, using the least fuzzy cost algorithm. These complete routes are stored in a store as a table of least cost routes 52, and in the forwarding table 24 for that service profile. Offered traffic is routed along the developed routes (one route per destination address and TOS combination), and as traffic volume builds, the link metric measurements change until they trigger an LSA update; this causes a recalculation of the instantaneously best routes for the routing table.

If the new least fuzzy cost route to a destination differs from the previously calculated best route, then it is stored along with the original route in the Table of Least Cost routes so that for the different destinations these tables expand as time progresses and routing calculations are updated and new routes are found. That is, the store contains details of a newly calculated instantaneously best path and previously instantaneously best paths to a particular destination of different ages or length of storage. All or some, such as a subset of the most recent, may be considered as candidate paths whereby the traffic is shared amongst such candidate paths to a destination, dependant in part, but not wholly, upon each path's suitability. The architecture 50 relies on the availability of the link state information about the network, stored in the LSD 18, and uses the fuzzy logic system 32 to calculate fuzzy path costs to grade or weight the calculated routes in deciding upon how packets destined for the same address should be shared or allocated to them.

The fuzzy logic system 32 uses the network metrics and rule base described above (or variants thereof) in allocation control 54 to calculate these weights for each reachable destination address for the most recently measured values representative of the current network state, irrespective of the choice of routing algorithm used, using the network metrics and rule base described above. Each candidate stored route has a fuzzy cost calculated on the basis that a small volume of additional traffic of negligible bandwidth, called "probe" traffic, is applied to that route. Accordingly, each candidate path returns one of the above described values of least fuzzy cost as a basis for suitability. However, since the objective of distributing the traffic is to ensure that routes are ideally used, so leading to an "Excellent" value for the least fuzzy cost of the route, the weights for each route should reflect these calculated fuzzy cost values for the "probe" traffic volume. Thus, any route which already has traffic levels commensurate with it having an "Excellent" fuzzy cost should not be used for additional traffic, any route with a "Bad" fuzzy cost should ideally have some of its traffic displaced onto other routes (consequently lowering the used bandwidth of that route and moving the fuzzy cost closer to "Excellent"), and the additional traffic should be placed on those routes where the fuzzy cost is currently "Good" or "Very Good" and where additional traffic would move the cost towards an "Excellent" value. That is, the weights are such that paths having fuzzy costs of good or very good are heavily weighted whilst paths that have excellent or bad fuzzy costs are lightly weighted, or more generally, a path having a medium fuzzy cost is heavily weighted whereas a path having a high or a low fuzzy cost is lightly weighted.

Previously used weights are then adjusted with these changes in mind, and then normalised so that all the weights to a given destination sum to one. (Initially a route will have weight one if it is the only route and each successive new route will start with a weight of zero). These weights are then stored along with the routes in the least cost routing tables.

The calculation of new weights for the candidate routes that are in effect competing is thus based upon changes in link metrics, which are detected, distributed around the network and lead to changes in the Link State Database, triggering a routing recalculation. The final aspect of the route flap mitigation is that the weights are used to decide which entry goes into the forwarding table for that destination address and service profile. A generator 56 of an effectively random number can be used to decide which route is allocated to the final forwarding table. As an example, if there are two routes R1 and R2, with weights w(R1)=0.8 and w(R2)=0.2 respectively, then a random number, r, uniformly distributed between 0 and 1 can be used to select the route such that:

If $0 \leq r \leq 0.8$ then choose R1

If $0.8 < r \leq 1.0$ then choose R2

If the calculation of random numbers is carried out at frequent intervals, and more frequently than changes to advertised network metrics trigger calculation of a new instantaneous best route, and notwithstanding that the route is indeterminate, and used to select a suitable candidate stored path for the forwarding table as indicated, then the effect will be to distribute the traffic in a shared manner that mitigates route flap. It will be appreciated that the number may be truly random or pseudo-random in having a long interval before repetition and may be provided by generation when required or from a store of previously generated numbers. Also, of course, it is not essential to normalise the weights so that the sum to 1 and provide random numbers in the range 0 to 1, as long as numbers are provided in a range that corresponds to the sum of the weights and the range is divided into sections corresponding to the weight values, any range of values may be used.

Thus in general, and notwithstanding the randomising factor, the weight represents the suitability of a candidate path for the current network conditions in terms of its network cost and also increases the likelihood of the path chosen by the random number, but the element of inconsistency that allocates the paths in a shared manner may be likened to dampening the erstwhile tendency to always adopt a newly instantaneously best path.

Figure 9A:
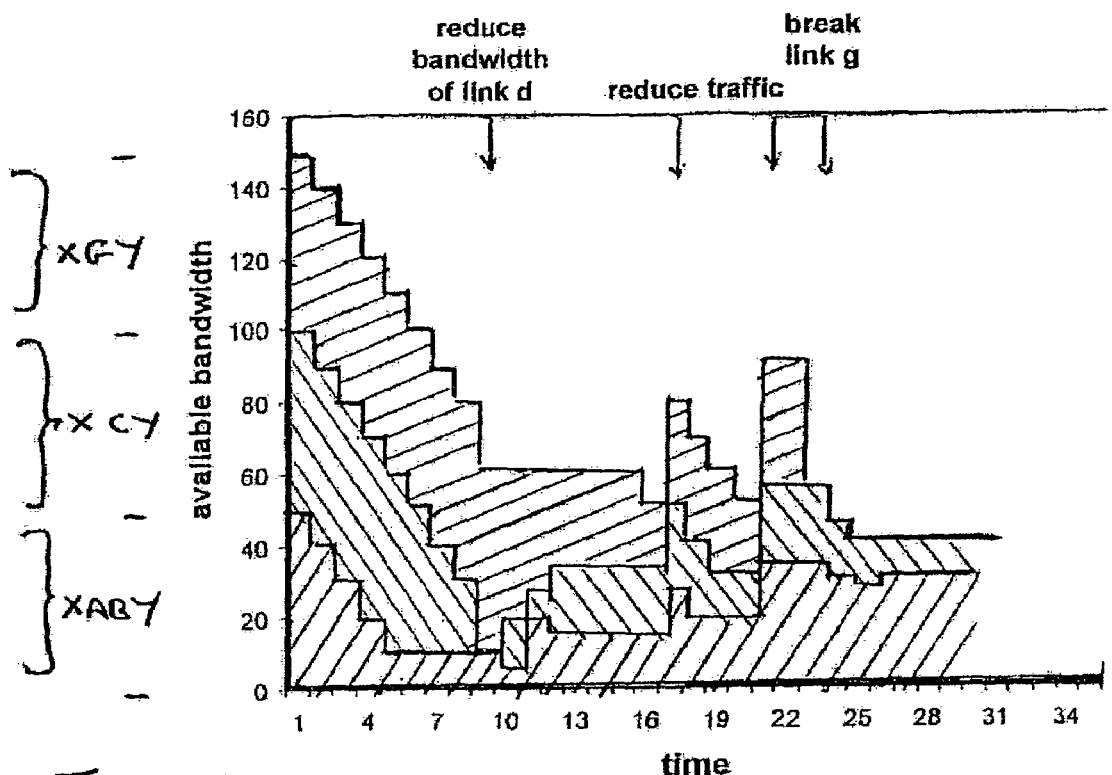
FIG. 9(a) shows an example of how the available bandwidth varies as traffic is ramped in the network of FIG. 1, with certain link and traffic volume changes with time, when the network is running the routing protocol based on the fuzzy logic system route determining algorithm and an allocation control system, itself based on the fuzzy logic system, in place to mitigate route flap.

As an example of the effect this load sharing technique has upon the distribution of traffic and the occurrence of route flap, the network presented in FIG. 1 was simulated using the least fuzzy cost routing algorithm alone to calculate routes and without the route flap mitigation technique of allocation included to determine the spread of traffic between the three possible routes XABY, XCY and XGY. The simulation was with a traffic volume initially ramped up and with various changes to link bandwidths and availability, as represented in FIGS. 7(a) and 7(b). The corresponding profiles of available bandwidth and traffic load for the case where the route flap mitigating allocation was used with least fuzzy cost routing are shown in FIG. 9(a) and FIG. 9(b) respectively.

Initially the traffic flows only on the path XABY, since the routing algorithm has only found this route based on the least fuzzy cost calculations. At time=5, the routing calculation finds the route XCY, and the non-automatic allocation method ensures that this is gradually used while path XABY continues to be used up to its bandwidth margin. At time=9, the available bandwidth on route XCY goes to zero temporarily as the additional offered traffic is loaded on to it and its total bandwidth falls concurrently. Consequently, at time=10, the routing re-calculation discovers route XGY for the first time as having the least fuzzy cost, and some of the traffic is then apportioned onto this path. This split between the three routes continues for a significant time period (with modest variations in the proportions) and continues through the reduction of offered traffic at time=17 and time=21. Only when link g is broken (time=23) and the fuzzy cost of path XGY becomes very large does the distribution of traffic return to a split between XABY and XCY. After some minor oscillations (time=24 to time=28) the distribution settles to a constant ratio.

Figure 9B:
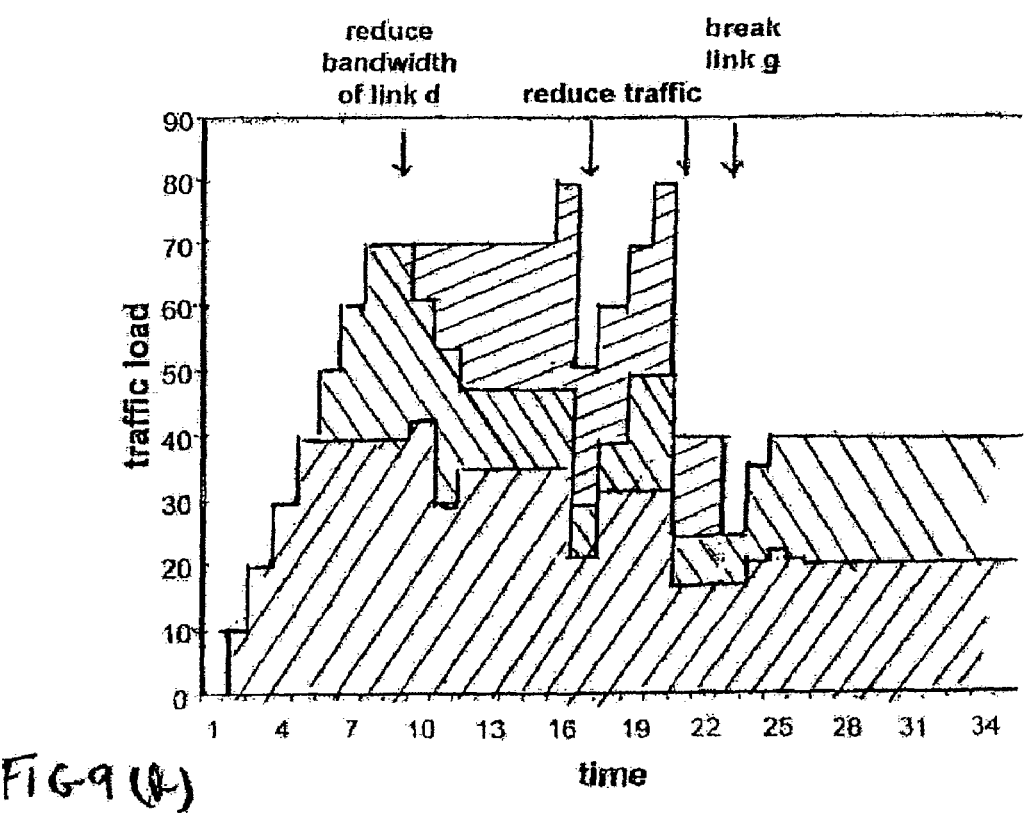
FIG. 9(b) shows the volume of traffic on each route for the network running the fuzzy logic based routing protocol for route determination and allocation control.

The graph of traffic loading, shown in FIG. 9(b), shows that there is no traffic overload in this case although the offered traffic profile is identical to that in the example of FIG. 7(b) without the route flap mitigation. The graph shows the distribution of traffic between the identified routes and their variation as the offered traffic is varied and link properties are changed. This illustrates how the route flap mitigation technique works in a realistic network.

It will be appreciated that such route flap mitigation may be effected by allocating the traffic to such stored paths according to suitability on other than a weighted-random basis. If the paths are weighted on the basis of the fuzzy cost, the individual routes may be selected in a more structured manner from a table or by calculation. Also, candidate paths may be allocated other than in accordance with their currently calculated fuzzy costs, although it is not expected to have the same degree of efficiency. For example, all of the candidate stored paths may be given an equal weighting or one following a predefined scheme, such as according to how recently stored.

Although fuzzy costs are described above as based upon the same network metrics as employed for the routing calculation (to give instantaneously best paths) it will be appreciated that the fuzzy costs for allocating paths may be based upon different ones or a different number of metrics that can represent suitability in terms of network cost.

Although traffic allocation for route flap mitigation is described above with the fuzzy cost function applied as an adjunct to least cost routing using a fuzzy cost, it may be employed with effect with any QoS routing algorithm.

Figure 10:
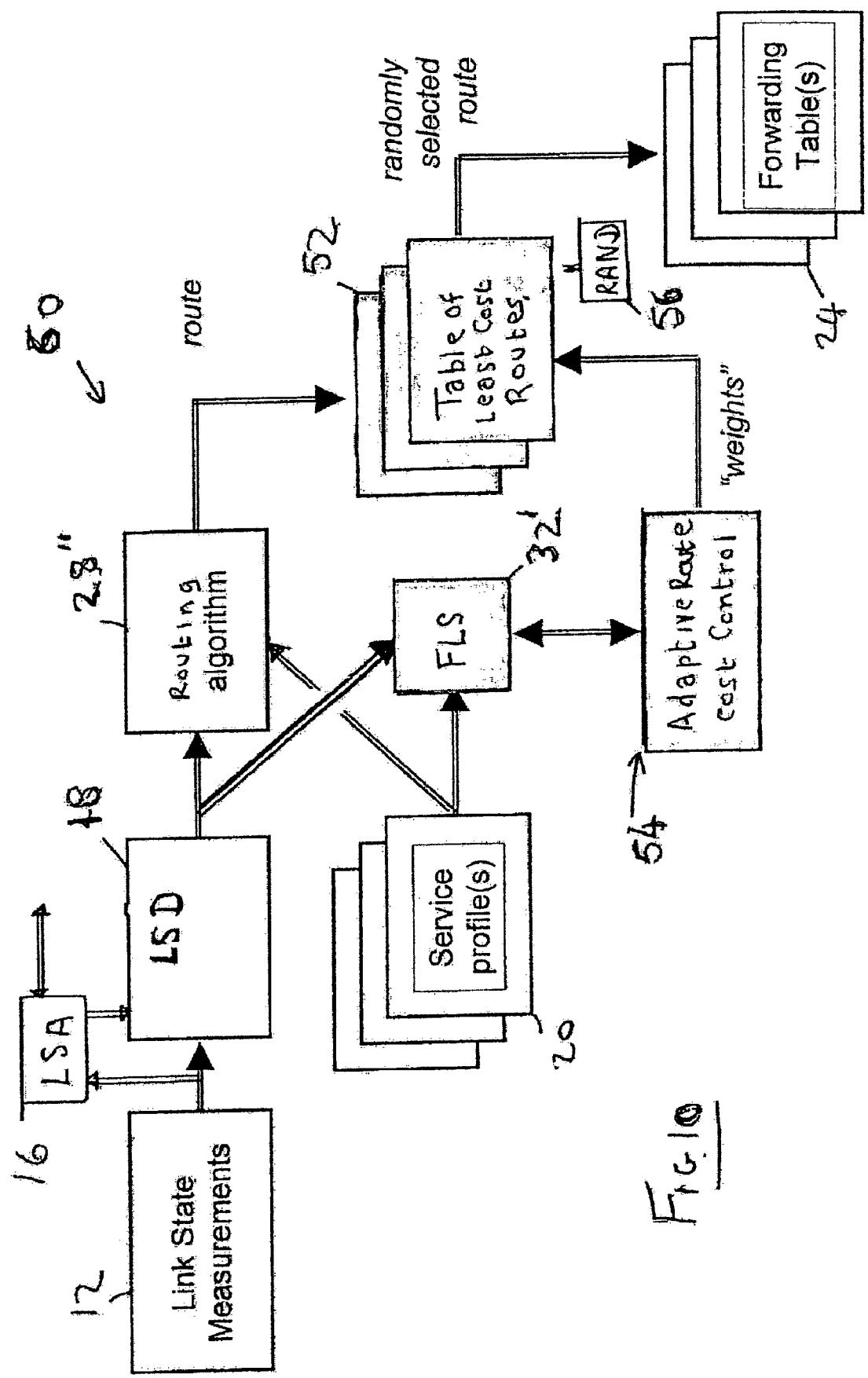
FIG. 10 is a schematic architecture of an alternative form of routing protocol in accordance with the invention for a generic QoS route determining algorithm with the route allocation control system using the fuzzy logic scheme.

Referring to network 60 in FIG. 10, this shows a schematic architecture similar to that 50 of FIG. 8 except that there is no interrelationship between fuzzy logic 32' and QoS routing algorithm 28". The QoS routing algorithm thus provides a first processing step of the network deriving over time instantaneously best paths according to changing network conditions and a second processing step is thus provided by the route flap mitigating allocation of traffic to the candidate paths stored within the network, as performed by the fuzzy logic system 32', least cost routing tables 52 and adaptive least cost allocation control 54.

It will be understood by those skilled in the art that the above described functions are not to be construed as limited by the manner of implementation nor by combination with each other where it is clear that they can be implemented separately.

The invention claimed is:

1. A communications network comprising a plurality of nodes,
    including a source node, a destination node and a plurality of intermediate nodes, each node having a router for effecting transfer of traffic along links between the nodes, wherein a router of the source node is operable to determine from stored network topology information and measured network metrics an instantaneously best path between said node and the destination node, said instantaneously best path being entered into a routing table at a point of determination thereof, whereby to generate said instantaneously best path, and to allocate traffic to a newly determined instantaneously best path and at least one previously determined instantaneously best path in a shared manner, whereby said newly determined instantaneously best path is determined as not being the same as any of said previously determined instantaneously best paths,
    wherein the router of said source node is operable to provide, from said newly determined instantaneously best path and at least one said previously determined best path, a plurality of candidate stored paths, the router being further operable to determine, from current network metric values associated with each said candidate stored path, the suitability of each said candidate stored path to accept the traffic, said suitability of each stored path being determined as a weighting function value, the router being further operable to effect sharing by allocating the traffic to one at a time of said candidate stored paths in accordance with its determined suitability to carry the traffic and
    wherein the router of said source node is operable to allocate the traffic to a said candidate stored path on the basis of a succession of effectively random numbers within a range, the range corresponding to the sum of the weighting function values for the candidate stored paths, the router of said source node is operable to divide the range of said effectively random numbers into sections, each corresponding in size to a respective weighting function value of the candidate stored paths, and to allocate the traffic to the candidate stored path whose weighting function value corresponds to the section containing the current random number within the range.

2. The communications network according to claim 1, wherein the router of said source node is operable to run a source routing protocol to periodically determine said instantaneously best path between the source node and the destination node from the currently measured network metrics.

3. The communications network according to claim 1, wherein the router of said source node is operable to determine suitability of a candidate path from path costs of said candidate stored paths for a current state of the network.

4. The communications network according to claim 3, wherein the router of said source node includes a fuzzy logic system operable to determine for each of said candidate stored paths a fuzzy cost estimate of the path derived from at least one of the measured network metrics thereof as said path cost.

5. The communications network according to claim 4, wherein the fuzzy logic system includes input functions operable to receive, for each said candidate stored path, a set of values of at least one of the said current network metric values, a rule base relating said current network metric values, and an output function providing from the rule base as excited by each set of input metric values a fuzzy value estimate of the cost of said candidate stored path.

6. The communications network according to claim 5, wherein the fuzzy logic system is operable to receive values from at least one of available bandwidth and available delay metrics of the candidate path.

7. The communications network according to claim 5, wherein the fuzzy logic system is arranged to receive values from both available bandwidth and available delay metrics of the candidate path.

8. The communications network according to claim 7, wherein the router of said source node is operable to run within the node as said route determining step a routing algorithm sensitive to network state and traffic class and wherein the fuzzy logic system has input functions operable to receive, for the links of each said candidate path between said source node and destination node, a set of metric values of at least available cost, available bandwidth and available delay metrics, a rule base relating said metrics and an output function providing from the rule base as excited by the sets of metrics values a fuzzy cost value for the path and the routing algorithm is responsive to the fuzzy cost value for each said path to derive an instantaneously best path dependant on said fuzzy cost value.

9. The communications network according to claim 5, wherein the router of said source node is operable to determine, for each said candidate stored path, the fuzzy value estimate indicative of the effect of additional traffic on a network cost of the candidate stored path and determine the suitability of any said candidate path to pass traffic in accordance with the fuzzy value thereof being minimised by applied traffic.

10. The communications network according to claim 9, wherein the router of said source node is operable to determine the suitability of each said candidate stored path as the weighting function value related to the fuzzy value thereof, to provide the succession of effectively random numbers within a range, corresponding to the sum of the weighting function values for the candidate stored paths, divided into sections each corresponding in size to a respective weighting function value of the candidate stored paths, and to allocate the traffic to the candidate stored path whose weighting function value corresponds to the section containing a current random number within the range.

11. The communications network according to claim 1, wherein the router of said source node is operable to provide a said effectively random number at a frequency greater than each determination of the new instantaneously best path between said source node and said destination node.

12. The communications network according to claim 1, wherein the router of said source node is operable to provide a succession of effectively random numbers and allocate traffic to said candidate stored paths based upon said random numbers and said determined suitability.

13. The communications network according to claim 1, wherein the router of said source node is operable to run within the node, as said route determining step, a routing algorithm sensitive to network state and traffic class.

14. The communications network according to claim 13, wherein the router of said source node is operable to store the routing algorithm in machine readable form.

15. The communications network according to claim 14, wherein the routing algorithm is sensitive to the stored network topology, a network cost associated with each link, an available bandwidth of each link and delay on each link as currently available at the source node.

16. The communications network according to claim 15, wherein the router of said source node is operable to provide a fuzzy logic system having input functions operable to receive, for the links of each candidate path between said source node and destination node, a set of metric values of at least available cost, available bandwidth and available delay metrics, a rule base relating said metrics, and an output function providing from the rule base as excited by the sets of metric values a fuzzy cost value for the path and the routing algorithm is responsive to the fuzzy cost value for each said candidate path to derive said instantaneously best path dependant on said fuzzy cost value.

17. The communications network according to claim 16, wherein, for each of said traffic class and said source node and said destination node, the routing algorithm is a least cost routing algorithm responsive to the said current network metric values associated with each said candidate stored path stored within the node and fuzzy cost value to determine a least fuzzy cost path to said destination node.

18. The communications network according to claim 17, wherein the routing algorithm is the Dijkstra least cost routing algorithm, modified for the use of fuzzy cost value in place of link cost.

19. A router for use at a node of a communications network, the communications network comprising a source node, a destination node and a plurality of intermediate nodes, the router being operable to effect transfer of traffic along links between the nodes, the router being operable to determine from stored network topology information and measured network metrics an instantaneously best link from that node to a next node to form an instantaneously best path between the source node and the destination node, said instantaneously best link being entered into a routing table at a point of determination thereof, whereby to generate said instantaneously best link, and to allocate traffic to a newly determined instantaneously best link and at least one previously determined instantaneously best link in a shared manner, whereby said newly determined instantaneously best link is determined as not being the same as any of said previously determined instantaneously best links, wherein the router is operable to provide, from said newly determined instantaneously best link and at least one said previously determined best link, a plurality of candidate stored links, the router being further operable to determine, from current network metric values associated with each candidate stored link, the suitability of each said candidate stored link to accept the traffic, said suitability of each candidate stored link being determined as a weighting function value, the router being further operable to effect sharing by allocating the traffic to one at a time of said candidate stored links in accordance with its determined suitability to carry the traffic, and wherein the router is operable to allocate the traffic to a said candidate stored link on the basis of a succession of effectively random numbers within a range, the range corresponding to the sum of the weighting function values for the candidate stored links, the router being is operable to divide the range of said effectively random numbers into sections, each corresponding in size to a respective weighting function value of said candidate stored paths, and to allocate the traffic to said candidate stored path whose weighting function value corresponds to the section containing a current random number.

20. The router according to claim 19, which is operable to run a distributive routing protocol to periodically determine from the currently measured network metrics said instantaneously best link between that said node and said next node to form a path between the source node and the destination node.

21. The router according to claim 19, which is operable to determine suitability of a candidate stored path from path costs of candidate stored paths for a current state of the network.

22. The router according to claim 21, which includes a fuzzy logic system operable to determine for each of said candidate stored paths a fuzzy cost estimate of the path derived from at least one of the measured network metrics thereof as said path cost.

23. The router according to claim 22, wherein the fuzzy logic system includes input functions operable to receive, for each candidate stored path, a set of values of at least one of the said current network metric values associated with each said candidate stored path, a rule base relating said current network metric values, and an output function providing from the rule base as excited by each said set of values a fuzzy cost estimate of a cost of said candidate stored path.

24. The router according to claim 23, wherein the fuzzy logic system is operable to receive values from at least one of available bandwidth and available delay metrics of each said candidate stored path.

25. The router according to claim 23, wherein the fuzzy logic system is arranged to receive values from both available bandwidth and available delay metrics of each said candidate stored path.

26. The router according to claim 25, wherein the router of said source node is operable to run within the node as said traffic allocating step a routing algorithm sensitive to network state and traffic class and wherein the fuzzy logic system has input functions operable to receive, for the links of each candidate path between said source and destination, a set of metric values of at least available cost, available bandwidth and available delay metrics, a rule base relating said metrics and an output function providing from the rule base as excited by the set of metric values a fuzzy cost estimate for the path and the routing algorithm is responsive to the fuzzy cost estimate for each said path to derive said instantaneously best path dependant on said fuzzy cost estimate and the fuzzy logic system is operable to determine fuzzy cost estimate for determination of a least fuzzy cost estimate path as instantaneously best path to the destination and suitability of candidate stored routes for allocation.

27. The router according to claim 23, which is operable to determine, for each said candidate stored path, the fuzzy cost estimate indicative of the effect of additional traffic on a network cost of said candidate stored path and determine the suitability of any said candidate stored path to pass traffic in accordance with the fuzzy cost estimate thereof being minimised by applied traffic.

28. The router according to claim 27, which is operable to determine the suitability of each said candidate stored path as the weighting function value related to the fuzzy cost estimate thereof, provide the succession of effectively random numbers within a range, corresponding to the sum of the weighting function values for said candidate stored paths, divided into sections each corresponding in size to a respective weighting function value of each of said candidate stored paths, and to allocate the traffic to the candidate stored path whose weighting function value corresponds to the section containing a current random number.

29. The router according to claim 19, which is operable to provide a said effectively random number at a frequency greater than each determination of the new instantaneously best path between said source node and said destination node.

30. The router according to claim 19, which is operable to provide the succession of effectively random numbers and to allocate traffic to said candidate stored paths based upon said random number and said determined suitability.

31. The router according to claim 19, which is operable to run within the node as said traffic allocating step a routing algorithm sensitive to network state and traffic class.

32. The router according to claim 31, which is operable to store the routing algorithm in machine readable form.

33. The router according to claim 32, wherein the routing algorithm is sensitive to the stored network topology, a network cost associated with each link, an available bandwidth of each link and delay on each link as currently available at the node.

34. The router according to claim 33, which is operable to provide a fuzzy logic system having input functions operable to receive, for the links of each candidate path between said source and destination, a set of metric values of at least available cost, available bandwidth and available delay metrics, a rule base relating said metrics, and an output function providing from the rule base as excited by the sets of metric values a fuzzy cost estimate for the path and the routing algorithm is responsive to the fuzzy cost estimate for each said path to derive said instantaneously best path dependant on said fuzzy cost estimate.

35. The router according to claim 34, wherein, for each of said traffic class and said source node and said destination node, the routing algorithm is a least cost routing algorithm responsive to said network metric values associated with each said candidate stored path stored within the node and fuzzy cost estimate to determine a least fuzzy cost estimate path to said destination node.

36. The router according to claim 35, wherein the routing algorithm is the Dijkstra least cost routing algorithm, modified for the use of fuzzy cost estimate in place of link cost.

37. A method of determining a path between a source node and a destination node in a communications network comprising the source node, the destination node and a plurality of intermediate nodes, the method comprising the steps of:

determining an instantaneously best path between said source node and said destination node based on measured network metrics;

entering said instantaneously best path into a routing table at a point of determination thereof, whereby to generate said instantaneously best path;

subsequently determining a new instantaneously best path between said source node and said destination node based on more recently measured network metrics; and, where the new instantaneously best path is determined as not being the same path as any previously determined instantaneously best path;

allocating traffic to said new instantaneously best path and at least one previously determined instantaneously best path in a shared manner, the method of allocating comprising:

providing from each said newly determined instantaneously best path and at least one previously determined best path, a plurality of candidate stored paths;

determining, from the current network metric values associated with each candidate stored path, the suitability of each said candidate stored path to accept the traffic;

determining said suitability of each stored path as a weighting function value;

effecting sharing by allocating the traffic to one at a time of said candidate stored paths in accordance with its determined suitability to carry the traffic; and allocating the traffic to a said candidate stored path on the basis of a succession of effectively random numbers within a range, the range corresponding to the sum of the weighting function values for the candidate stored paths; and dividing the range of said effectively random numbers into sections, each corresponding in size to a respective weighting function value of the candidate stored paths, and allocating the traffic to the candidate stored path whose weighting function value corresponds to the section containing a current random number.

38. The method according to claim 37, wherein the traffic is shared between said paths on a time basis by switching the traffic between said paths during the period between the determination of the new instantaneously best path and a subsequent determination of a further new instantaneously best path.

39. The method according to claim 37, wherein each node between the source node and the destination node operates a distributive routing protocol to periodically determine said instantaneously best link from that node to a next node in a concatenation of links between said source node and said destination node that will form the path between source node and said destination nodes.

40. The method according to claim 37, comprising determining suitability of a candidate path from path costs of the candidate paths for a current state of the network.

41. The method according to claim 37, comprising determining suitability of each said candidate path in terms of a fuzzy cost estimate of the path derived from at least one of the measured network metrics thereof.

42. The method according to claim 41, wherein the fuzzy cost estimate is derived by fuzzy logic input functions operable to receive, for each said candidate stored path, a set of values of at least one of said current network metric values associated with said candidate stored path, a rule base relating said metric values, and an output function providing from the rule base as excited by each set of input metric values a fuzzy value estimate of a cost of said candidate stored path.

43. The method according to claim 41, comprising determining said fuzzy cost estimate of a said candidate path from at least one of available bandwidth and available delay metrics of the path.

44. The method according to claim 43, comprising determining said fuzzy cost estimate of a said candidate path from both available bandwidth and available delay metrics of the path.

45. The method according to claim 43, comprising determining for each said candidate stored path the fuzzy cost estimate indicative of the effect of additional traffic on a network cost of the candidate stored path and determining the suitability of any said candidate path to pass traffic in accordance with the fuzzy cost thereof being minimised by applied traffic.

46. The method according to claim 37 comprising providing said succession of effectively random numbers at a frequency greater than each determination of the new instantaneously best path between said source node and said destination node.

* * * * *